United States Patent [19]
Kimber, Jr.

[11] 3,803,998
[45] Apr. 16, 1974

[54] PERCOLATOR PUMP AND BASKET ASSEMBLY

[75] Inventor: Ray L. Kimber, Jr., West Elmira, N.Y.

[73] Assignee: Corning Glass Works, Corning, N.Y.

[22] Filed: July 13, 1972

[21] Appl. No.: 271,605

[52] U.S. Cl. ................................................ 99/310
[51] Int. Cl. .......................................... A47j 31/00
[58] Field of Search ............ 99/310, 311, 312, 308, 99/313, 314

[56] References Cited
UNITED STATES PATENTS

| | | | |
|---|---|---|---|
| 1,092,575 | 4/1914 | Jessup | 99/310 |
| 408,707 | 8/1889 | Goodrich | 99/310 |
| 1,106,045 | 8/1914 | Heyne | 99/310 |
| 1,309,414 | 7/1919 | Huning | 99/312 |

*Primary Examiner*—Robert W. Jenkins
*Attorney, Agent, or Firm*—Burton R. Turner

[57] ABSTRACT

A pump and basket assembly for a coffee maker is formed with a two-part pump having an upper extension portion formed integrally with the basket and a lower base portion which is easily connectable to the upper portion in a snug relationship by means of a snap-lock arrangement.

3 Claims, 2 Drawing Figures

3,803,998

PERCOLATOR PUMP AND BASKET ASSEMBLY

BACKGROUND OF THE INVENTION

The invention resides in the field of coffee makers, and particularly is concerned with the specific problems encountered in the manufacture of pump and basket assemblies from inexpensive materials for percolators and the like.

It has been customary in the prior art to fabricate pumps and baskets for coffee makers, such as percolators, from suitable metals. In such known constructions, the pump is formed as a unitary tubular member having a suitable stand or base portion and the basket is provided with a central bottom opening for receiving an upper portion or stem of the pump which projects upwardly therethrough. The pump is further provided with a collar or shoulder-stop portion which limits the downward travel of the basket on the pump stem and thereby positions the basket thereon.

In recent years, pumps and baskets of standard construction have been formed from suitable plastic materials such as polypropylene. However, although material and manufacturing costs are reduced through the use of polypropylene, the resulting assemblies have not been entirely satisfactory due to the fact that the longitudinally extending pump stems have a tendency to warp or distort during the manufacturing process. Accordingly, polypropylene pumps of standard construction are currently being produced with a high percentage of warped or distorted stem portions which make such pumps unacceptable for use in coffee makers.

The present invention obviates the problems heretofore encountered when forming conventional pump and basket assemblies from polypropylene, by obviating the pump stem warpage problem through the utilization of a novel two-part basket and pump construction wherein the upper extension portion of the pump is actually formed integrally with the basket per se.

SUMMARY OF THE INVENTION

In its simplest form, the present invention includes a two-part pump and basket assembly for coffee makers formed in such a manner so that the upper extension of the pump is an integral part of the basket. That is, the basket is provided with a central tubular portion forming an upper extension of the pump. The tubular extension is connected to and projects outwardly from the bottom of the basket, with a connecting flange portion projecting downwardly from the bottom of the basket, and an upper pump extension portion extending upwardly through the basket and terminating above the upper edge of the sidewalls forming such basket. The lower pump section has a base or stand portion and an upwardly extending tubular portion which projects within, and is lockably received by, the connecting flange portion projecting downwardly from the bottom of the basket. A snap-lock arrangement retains the two portions in an operable connected relationship.

An object of the invention has been to provide a novel pump and basket assembly for coffee makers which obviates the problem of warpage in elongated polypropylene pump stems, by forming the pump in two sections with the upper section being integrally formed with the basket per se.

DESCRIPTION OF THE PREFERRED EMBODIMENTS

Figure 1:
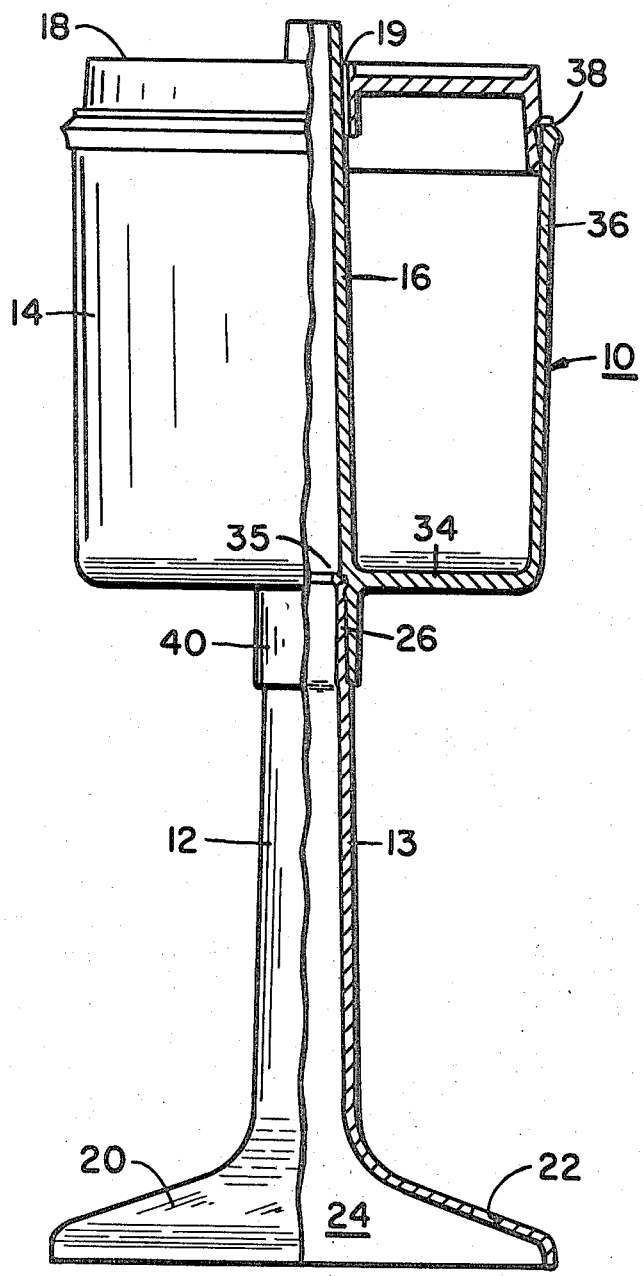
FIG. 1 is a side elevational view, partially in section, illustrating a pump and basket assembly embodying the present invention.

Referring now to the drawings, and particularly FIG. 1, a pump and basket assembly 10 is shown comprising a lower pump section 12, a basket 14 having an integral upper pump extension portion 16, and a conventional spreader plate 18 which forms no part of the present invention. The lower pump section 12 has an enlarged base or stand portion 20 provided with a conventional opening 22 for facilitating the entrance of the fluid into the well portion 24. The lower pump section 12 is provided with an offset upper end portion 26 having a tapered entrance or nose portion 28, a recessed annular locking portion 30, and a shoulder portion 32, which are more clearly seen in FIG. 2.

The basket 14 has a bottom portion 34 provided with the usual drain holes (not shown) and an annular sidewall portion 36 terminating in an upper edge 38, upon which an annular flange of spreader plate 18 is positioned. The upper pump extension portion 16 is formed integrally with the basket 14 and extends upwardly within the basket 14 from an opening 35 formed through the bottom portion 34, and projects through a central opening 19 formed in spreader plate 18. In addition, a connecting flange portion 40 projects downwardly from bottom portion 34 and acts as a coupling extension for the upper pump portion 16. As shown more particularly in FIG. 2, the downwardly extending connecting flange portion 40 has a bevelled or tapered entrance portion 42, a plurality of guiding and strengthening ribs 44 longitudinally positioned about its inner circumference, and an annular snap-in locking boss 46 extending about the inner periphery of the flange adjacent its upper end.

Figure 2:
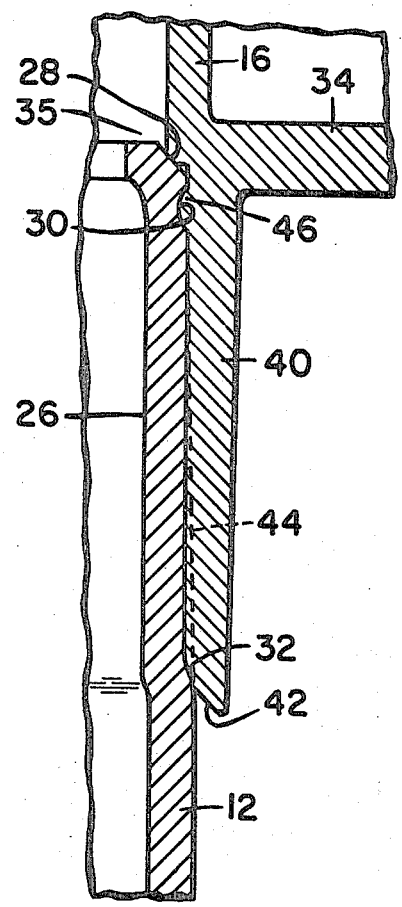
FIG. 2 is a greatly enlarged fragmental view in section illustrating the snap-lock arrangement provided between the lower base portion and upper extension portion of the two-part pump.

As shown particularly in FIG. 2, the offset upper end portion 26 of the lower pump section 12 is lockably positioned within the downwardly projecting connecting flange portion 40 of basket 14. Tapered nose portion 28 on the offset upper end portion 26 and the bevelled entrance portion 42 on flange 40 facilitate the positionment of the lower pump section 12 within the connecting flange 40 of basket 14. In addition, the guiding and strengthening ribs 44, which extend longitudinally of the flange 40 and are positioned about the internal periphery thereof, function to not only strengthen the flange but also guide the offset upper end portion 26 therewithin. Further, the tapered nose portion 28 not only facilitates a sliding movement past the annular locking boss 46, but also provides a stop abutment with a lower shoulder of upper pump extension portion 16 so as to position the recessed annular locking portion 30 in cooperating relationship with the snap-in annular locking boss 46. Accordingly, when the lower pump section 12 is so snapped into position with the connecting flange portion 40 of basket 14, a continuous two-part pump assembly is provided which includes the lower pump section 12 and the upper pump extension portion 16.

By manufacturing the pump in two parts, with the upper part being formed integral with the basket per se, and snap-locking the two portions together, it is possible to produce substantially straight and upright pumps of significant height out of suitable plastic materials such as polypropylene. Heretofore, it has been virtually an impossibility to repeatably produce unitary pumps of polypropylene for nine-cup percolators, due to a severe warping problem inherent in the known manufacturing processes. Accordingly, the present invention has overcome the problem of unacceptable pumps due to warpage by providing a two-part pump assembly which is easily snapped together and snapped apart as desired.

It will be apparent that the connecting flange portion 40 could in fact extend downwardly a sufficient distance so as to virtually eliminate the need for the tubular portion of lower pump section 12. In such an instance, the lower end of the outwardly projecting tubular connecting flange portion could then be directly snapped into a base or stand, similar to stand portion 20. Further, such a stand could be manufactured from polypropylene or a suitable metal such as aluminum. The resulting product would in essence operate similar to that shown, except that the snap-lock arrangement 30, 46 adjacent the basket bottom 34, would be positioned adjacent the stand 20. In both cases, the pump and basket assembly would operate within a percolator in the same manner as a conventional basket and pump assembly operates today.

Although I have disclosed the now preferred embodiments of my invention, it will be apparent to those skilled in the art that various changes and modifications may be made thereto without departing from the spirit and scope thereof as defined in the appended claims.

I claim:

1. An improved pump and basket assembly for coffee makers which comprises, a basket having a bottom portion and upwardly extending sidewall portions, an upper pump extension portion formed integrally with the bottom of said basket and extending upwardly within said basket, said upper pump extension terminating above an upper edge of said sidewall portions, a lower pump section having a tubular stem portion and a base portion, means for locking said lower pump section to said basket and thereby form a continuous two-part pump with said lower pump section and said upper pump extension portion, said means for locking said lower pump section to said basket including a connecting flange portion extending downwardly from the bottom portion of said basket and an offset upper end portion formed on said lower pump section, and said offset upper end portion being positioned within and retained by said downwardly extending connecting flange portion.

2. An improved pump and basket assembly for coffee makers which comprises, a basket having a bottom portion and upwardly extending sidewall portions, an upper pump extension portion formed integrally with the bottom of said basket and extending upwardly within said basket, said upper pump extension terminating above an upper edge of said sidewall portions, a lower pump section having a tubular stem portion and a base portion, means for locking said lower pump section to said basket and thereby form a continuous two-part pump with said lower pump section and said upper pump extension portion, said means for locking said lower pump section to said basket including an offset upper end portion formed on said lower pump section having an annular recessed locking portion, a connecting flange portion extending downwardly from said basket having an annular locking boss extending about an inner peripheral portion of said flange portion, and said annular locking boss being snap-fitted within said annular recessed locking portion so as to operably connect said basket and pump section together.

3. An improved basket and pump assembly as defined in claim 2 wherein said offset upper end portion has a tapered nose portion for facilitating the positionment of the lower pump section within said connecting flange portion, and said connecting flange portion has a plurality of guiding and strengthening ribs longitudinally positioned about the inner periphery thereof for facilitating the positionment of the offset upper end portion therewithin.

* * * * *